(No Model.)
J. DANZ, Jr.,
DECOY DUCK.
No. 244,038.
Patented July 12, 1881.
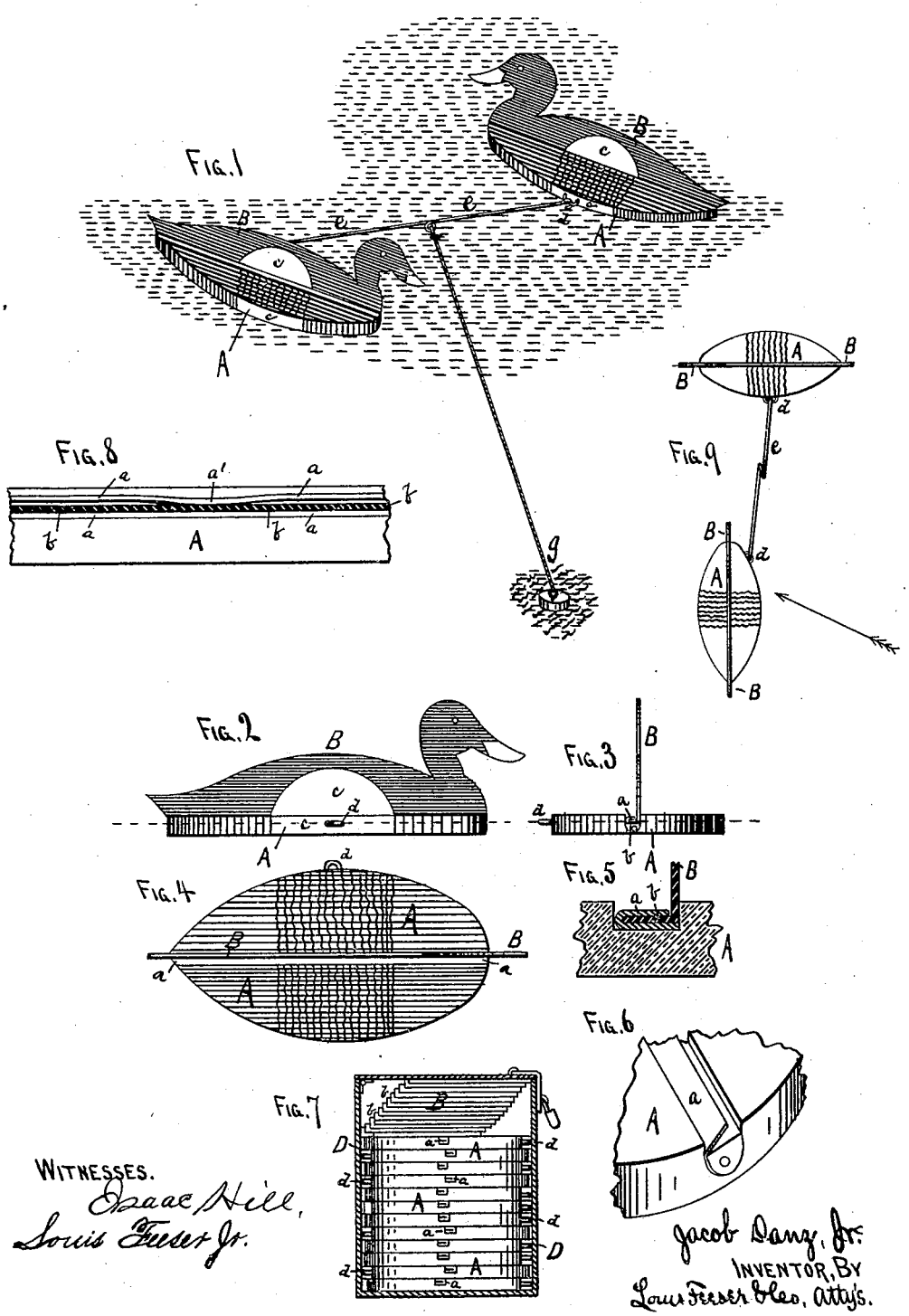
WITNESSES.
Isaac Hill,
Louis Fieser Jr.
Jacob Danz, Jr.
INVENTOR, BY
Louis Fieser & Co., Att'ys.

UNITED STATES PATENT OFFICE.

JACOB DANZ, JR., OF ST. PAUL, MINNESOTA.

DECOY DUCK.

SPECIFICATION forming part of Letters Patent No. 244,038, dated July 12, 1881.

Application filed January 21, 1881. (No model.)

*To all whom it may concern:*

Be it known that I, JACOB DANZ, Jr., of St. Paul, in the county of Ramsey and State of Minnesota, have invented certain new and useful Improvements in Decoy Ducks, Geese, &c., of which the following is a specification.

This invention relates to decoys used by hunters to lure game within range of their guns; and it consists in a float having a plate of sheet metal or other material cut in the form of the profile of a duck, goose, or other creature it is desired to imitate attached thereto in an upright position, so that when set upon the water it will have the appearance of a live bird, the profile being so arranged that it can be readily disconnected from or folded down upon the float for convenience in transportation; and, furthermore, in the manner of connecting two or more of the decoys together and anchoring them to the bottom, so that they may be acted upon by the wind or currents and moved about to give them still more the appearance of life, as hereinafter set forth. I accomplish these results by the use of the mechanism illustrated in the accompanying drawings, in which—

Figure 1 is a perspective view representing a pair of the decoys set upon the water and anchored to the bottom. Fig. 2 is an enlarged side elevation, Fig. 3 is an enlarged end elevation, and Fig. 4 is an enlarged plan view, of one of the decoys. Fig. 5 is a full-sized cross-section through a portion of the float and the lower part of the sheet-metal profile, showing the manner of arranging the joint. Fig. 6 is a full-sized perspective view of a portion of one end of a float, showing the manner of forming the holding-strip and groove. Fig. 7 shows the cross-section of a box containing a number of the decoys disconnected and packed for transportation. Fig. 8 is a full-sized view of a longitudinal section of a portion of the center of the float, showing the manner of forming the center of the holding-strip to aid in holding the profile more firmly in place. Fig. 9 is a plan view of a pair of the decoys connected to each other, illustrating the manner in which the wind or currents act upon them to keep them moving about.

A is a wooden float pointed or rounded at either end, and resembling the outlines of the body of a duck, goose, or other bird it is designed to imitate, when viewed from above, and provided with a longitudinal groove down the center of its upper side. Secured in the bottom of this groove is a metal strip, $a$, bent over upon itself, as shown, to form a channel, into which the right-angled edge $b$ of a sheet-metal plate, B, is run, to hold said plate in an upright position at right angles to the float. This plate B is cut in the form of the profile of the head and back of a duck, goose, or other bird it is desired to imitate. When viewed from the side, so that when the two parts—viz., the float A and profile B—are connected together and placed upon the water, they closely resemble a live bird, as shown in Fig. 1.

The float and profile may be painted in any desired manner to resemble the colors of the natural birds; but I find that simple broad patches of black and white, $c$, have the best effect, as they are more readily seen from a distance, and elaborate delineations of feathers, &c., are not necessary to deceive the game.

Upon the sides of the floats A small staples $d$ are arranged and provided with rods $e$, having anchors $g$ connected to their centers, by which two or more of the decoys may be fastened together and anchored at any desired spot. The anchor-line will be connected to the rod $e$ at the center, as shown, and one of the decoys placed nearly, if not quite, at right angles to the other, so that the profile B of one will be acted upon by the wind, the stationary anchor acting as a center around which the decoys are moved back and forth by the wind and currents to give them the appearance of moving about in the water, and greatly adding to the effect.

By varying the positions of the staples $d$ any desired movement may be given to the decoys.

Fig. 9 shows a view of two of the decoys arranged upon the water thus, the arrow indicating the direction of the wind or current.

The center of the strip $a$ will be depressed, as shown at $a'$, Fig. 8, to cause it to bind upon the right-angled edge $b$ and hold it with some degree of force, so that the profile B will not become separated from the float A too easily or by accident.

When not in use, or when being transported, the floats and profiles and rods and anchors will be separated and packed in a box or other receptacle, as shown in Fig. 7, which represents a box, D, with twelve of the decoys thus packed, By this means the hunter can carry with him on his excursions a supply of decoys, and with very little trouble, twelve of them—anchors, box, and all—not weighing over ten or twelve pounds; or by making the floats of cork or other light material and the profiles of waterproof pasteboard their weight can be greatly reduced.

The decoys may be made of any desired material; but for ordinary use I prefer them of wood and sheet metal.

I do not wish to confine myself to the manner shown of connecting the float and profile to each other, as I am aware that they may be formed in many ways, hinged together so as to fold up, or in any other suitable manner; but I prefer them as shown.

One set of floats may be used for two or more kinds of birds, so that the hunter may carry with him sets of goose and duck profiles and attach either kind to the same floats.

I am aware that it is not new in decoys to have a flat float provided with hinged wire guards to fit about the sides, neck, and tail of a dead duck or other bird to hold it to the float, a rubber or other band being used to hold the side guards against the sides of the bird.

What I claim as new is—

1. A decoy for sportsmen, consisting of a flat float provided with a groove or flanges, in combination with a profile of a bird provided with a flange at right angles thereto, whereby the float and profile are adapted to be securely held together by the flange and groove, and readily detached from each other for packing and transportation, as set forth.

2. In decoys, the combination and arrangement, with the float A, provided with the groove through its center, in which the grooved strip $a$ is secured, of the profile B, having its lower edge, $b$, bent over at right angles and adapted to be inserted into the grooved strip $a$, substantially as set forth.

3. The combination and arrangement, with decoys for hunters' use, of a connecting-rod, $e$, provided with the anchor $g$, secured to its center, substantially as shown, whereby the decoys may be acted upon by the wind or currents to cause them to move about the anchors as centers.

In testimony whereof I have hereunto set my hand in the presence of two subscribing witnesses.

JACOB DANZ, JR.

Witnesses:
C. N. WOODWARD,
LOUIS FEESER.